(12) United States Patent
McKee (10) Patent No.: US 7,891,933 B2
(45) Date of Patent: Feb. 22, 2011

(54) WORKING MACHINE

(75) Inventor: Michael McKee, Crewe (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 249 days.

(21) Appl. No.: 12/125,706

(22) Filed: May 22, 2008

(65) Prior Publication Data
US 2008/0292442 A1 Nov. 27, 2008

(30) Foreign Application Priority Data
May 26, 2007 (GB) .................................. 0710155.3

(51) Int. Cl.
E02F 3/00 (2006.01)
(52) U.S. Cl. .................... 414/694; 414/687; 414/685; 37/903; 37/403
(58) Field of Classification Search .............. 414/680, 414/685, 687, 694, 912; 37/403, 405, 410, 37/903; 172/272–275; 180/327, 329, 330, 180/331
See application file for complete search history.

(56) References Cited

U.S. PATENT DOCUMENTS

| | | | | |
|---|---|---|---|---|
| 3,606,047 | A | * | 9/1971 | Schaeff ........................ 414/694 |
| 4,746,264 | A | * | 5/1988 | Kishi et al. .................. 414/694 |
| 5,052,512 | A | * | 10/1991 | Pakosh et al. ............... 180/329 |
| 5,265,995 | A | * | 11/1993 | Beck ........................... 414/694 |

FOREIGN PATENT DOCUMENTS

| | | |
|---|---|---|
| DE | 10 2006 005 213 A1 | 12/2006 |
| EP | 0 433 244 A1 | 6/1991 |
| EP | 1 008 693 A1 | 6/2000 |
| EP | 1 176 260 A1 | 1/2002 |
| GB | 1 461 475 | 1/1977 |
| GB | 2 352 224 | 1/2001 |

(Continued)

OTHER PUBLICATIONS

Search Report for GB 0808634.0, dated Sep. 9, 2008.

(Continued)

*Primary Examiner*—Donald Underwood
(74) *Attorney, Agent, or Firm*—Marshall, Gerstein & Borun LLP (57) ABSTRACT

A working machine includes a body and a ground engaging structure, the body mounting a prime mover and a first working arm, the first working arm being pivoted for up and down movement about a first generally horizontal axis, and extending beyond a first end of the body and carrying in use, at its outermost end, a first working implement, and the body carrying towards a second end of the body opposite to the first end, a superstructure which is rotatable relative to the body about a first generally upright axis, the superstructure providing a mounting for a second working arm, which mounting permits the second working arm to be pivoted up and down about a second generally horizontal axis and to be rotated about a second generally upright axis, and second working arm in use, carrying at an outermost end, a second working implement, the superstructure mounting an operator's cab which provides an operator position including an operator seat and controls operable by an operator when occupying the seat, and wherein the operator's cab is rotatable about a third generally upright axis relative to the superstructure.

20 Claims, 7 Drawing Sheets

FOREIGN PATENT DOCUMENTS

| | | |
|---|---|---|
| GB | 2 395 187 A | 5/2004 |
| JP | 2000-209963 | 8/2000 |
| JP | 2005-232950 | 1/2004 |
| JP | 2005-350919 | 6/2004 |
| WO | WO-01/38649 | 5/2001 |

OTHER PUBLICATIONS

Search Report for GB0808632.4, dated Sep. 9, 2008.
Search Report for GB0808635.7, dated Sep. 9, 2008.

\* cited by examiner

WORKING MACHINE

BACKGROUND TO THE INVENTION

This invention relates to a working machine and more particularly to a working machine which is capable of performing multiple working operations using one or both of two working arms which carry working implement.

Working machines which are capable of performing both loading operations and excavating operations are well known. A typical prior art machine includes a working arm with a loading shovel at a front end of the machine, and a working arm with an excavating tool at the rear of the machine. In an operator's cab between the front and rear ends of the machine, the operator's seat may swivel between facing forwards and facing rearwards positions, so that in each operating position, the operator can operate controls appropriate for operating the loading arm or the excavating arm functions. The usual primary travelling direction of such machines i.e. the forwards direction when driven on a road, is with the front end leading, and controls in the operator's cab to drive the machine, are located so as to be operable when the operator is facing forwards.

DESCRIPTION OF THE PRIOR ART

A modified machine capable of performing loading and excavating operations has been proposed in our prior patent application GB-A-2395187. In this proposal, the excavating arm and the operator's cab are provided on a rotatable superstructure which enables an operator to use the excavating arm in a wider range of positions without having frequently to re-position the machine as a whole, compared to machines in which the position of the mounting which mounts the excavating arm at the rear of the machine, is fixed. However in our previously proposed machine, there was still a requirement for a swivellable operator's seat, and the operator used different controls depending on whether the operator is facing forwards or backwards, to perform excavating or loading functions. The normal forwards travelling direction is again with the end of the machine where the loading arm is provided, leading.

SUMMARY OF THE INVENTION

According to a first aspect of the invention we provide a working machine including a body and a ground engaging structure, the body mounting a prime mover and a first working arm. The first working arm may be pivoted for up and down movement about a first generally horizontal axis, and extend beyond a first end of the body and carrying in use, at its outermost end, a first working implement. The body may carry towards a second end of the body opposite to the first end, a superstructure which is rotatable relative to the body about a first generally upright axis, the superstructure providing a mounting for a second working arm, which mounting permits the second working arm to be pivoted up and down about a second generally horizontal axis and to be rotated about a second generally upright axis. The second working arm may, in use, carry at an outermost end, a second working implement. The superstructure may mount an operator's cab which provides an operator position including an operator seat and controls operable by an operator when occupying the seat, and wherein the cab is rotatable about a third generally upright axis relative to the superstructure.

By providing for the cab to be rotatable relative to the superstructure, whilst the superstructure is rotatable relative to the body, a machine which is capable of a wide range of working operations can be provided. Various modes of operation may be accomplished.

In a first operating mode, the operator's cab may be rotated relative to the superstructure to a position in which the operator in the operator position is facing the first end of the machine, in which position the operator may operate the controls for performing working operations using the first working implement, whilst the second working arm may be stowed at the second end of the body by rotating the superstructure relative to the body to bring the mounting to a position at the second end of the body, and rotating the second arm about the second generally horizontal and second generally upright axes, to fold the second working arm to a compact stowed condition.

In a second operating mode, the cab may be rotated relative to the superstructure to a position in which the operator in the operator position is facing the second end of the body, in which position the operator may operate the controls to drive the machine in a travelling direction.

In a third operating mode the superstructure may be rotated relative to the body so that the mounting of the second working arm is between the first and second ends of the machine, and the operator's cab may be rotated relative to the superstructure so that the second working arm is generally in front of the operator position so that the operator may operate the controls to perform working operations using the second working implement.

Thus compared to the prior art proposals described above, a machine in accordance with the present invention requires controls at a single position within the cab, rather than multiple control sets, for operation by the operator, and no swivellable seat is required because the whole operator's cab is rotatable between and including positions facing the first and second ends of the machine. Moreover the usual travelling direction of the machine is with the second end of the body, opposite the first end where the first working implement e.g. loading shovel, is provided, leading.

In a preferred embodiment the first working implement is a loading shovel and the first working arm is provided by a pair or arm members which, at least when the first working arm is pivoted downwards, receive between them, the prime mover which typically would be housed beneath a bonnet or other body structure. Desirably the loading shovel is pivoted about a third generally horizontal axis relative to the working arm, under the control of the controls of the operator position.

The second working arm may include a boom part which is mounted by the mounting to the superstructure at one end, and to one end of a dipper at or adjacent the other end, the dipper being pivotal relative to the boom at a first end of the dipper, about a fourth generally horizontal axis and carrying at a second end thereof, the second working implement. The second working implement may in one example be an excavating bucket, but in another example the second working implement may be a hammer tool, for examples only.

Although if required the superstructure may be rotatable through 360° relative to the body, and the operator's cab may be rotatable through 360° relative to the superstructure, desirably in each case the degree of rotation attainable is less than 360° in order to simplify the transmission of hydraulic and/or electrical services between on the one hand the body and the superstructure, and on the other hand between the superstructure and the operator's cab. By restricting relative rotation, conventional hydraulic hoses and cables etc. may convey the services between the relatively moveable components, whereas for a full 360° relative rotation, special rotatable transmission joints would be required.

In any event the machine may include a switching structure to switch service connections of the controls of the operator position, so that as the operator's cab is rotated relative to the body, control functions may be swapped over so that the same controls may be used to operate the first and second working arms and the respective working implements, depending upon the operator's cab facing position.

Desirably the overall length and configuration of the second working arm is such that with the cab rotated to a position in which the operator in the operator position is facing the second end of the body, and when the superstructure is rotated to a position in which the second working arm may extend towards the first end of the machine alongside the operator's cab, with the second end of the second working arm and/or the second working implement carried thereby, in engagement with the first working implement, the boom and dipper are relatively pivotable about the second and fourth generally horizontal axes such that the second working arm does not extend above the height of the operator's cab, and more preferably, so that the second working arm does not extend above the height of an operator seated in the operator position.

Thus for travelling, e.g. when the machine is driven on a road, the second working arm can be stowed alongside the operator's cab with its second end, and/or the second working implement engaged with the first working implement.

The machine may further include a third working implement carried at the second end of the body, such as a dozer or grading blade, mounted for up and down pivoting about a fifth generally horizontal axis, under the control of an operator operating the controls of the operator position.

Alternatively, the machine may be provided at the second end of the body with stabilizers which are lowerable into engagement with the ground, e.g. when the machine is excavating.

The prime mover may be an engine, and there may be a transmission from the prime mover to drive wheels of the ground engaging structure to enable the machine to travel. Desirably the primary forwards direction of travel of the machine is with the second end of the body leading, but the transmission may permit the machine to be driven in a reverse direction too.

Desirably the ground engaging structure includes four wheels which are steerable by an operator operating a steering wheel control of the operator position.

BRIEF DESCRIPTION OF THE DRAWINGS

Embodiments of the invention will now be described with reference on the accompanying drawings in which:—

DESCRIPTION OF THE PREFERRED EMBODIMENTS

Referring to the drawings, there is shown a working machine 10 which includes a body 11 which carries a ground engaging structure 12. The body 11 mounts a prime mover such as an engine 9, beneath a body housing part such as a bonnet 13. At one end 18 of the body 11 there is a provided a first working arm 16 which in this example will be referred to as a loading arm. The loading arm 16 is pivoted for up and down movement about a first generally horizontal axis A, and includes a pair of arm members 16a, 16b, each at a respective side of the bonnet 13. The arm 16 can be pivoted up and down about axis A by a pair of actuators 17 which each extends between the body 11 and a respective arm member 16a, 16b of the loading arm 16. It can be seen from FIG. 1 that when the loading arm 16 is lowered, the bonnet 13 and hence the prime mover 9 is received between the arm members 16a, 16b of the loading arm 16.

The loading arm 16 extends beyond the first end 18 of the body 11, and carries at its outermost end a first working implement 22, which in the example shown is a loading shovel. The loading shovel 22 is mounted to the loading arm 16 via a mounting structure 110 which permits the ready release of the loading shovel 22 for a purpose hereinafter described. The loading shovel 22 is pivotable about a generally horizontally extending shovel axis F, which movement is achieved by means of a pair of hydraulic linear actuators 22a via a linkage indicated at 23 by means of which the attitude of the loading shovel 22 may be maintained as the loading arm is pivoted up and down about the first generally horizontal axis A.

At a second end 24 of the body 11 opposite to the first end 18, the body 11 carries a superstructure 25. The superstructure 25 is rotatable relative to the body 11 about a first generally upright axis B, and the superstructure 25 also provides a mounting 26 for a second working arm 27. The mounting 26 is of the kind which permits the second working arm 27 to be pivoted up and down about a second generally horizontal axis C by an actuator 27a which acts between the superstructure 25 and the second working arm 27, and to be rotated about a second generally upright axis D relative to the superstructure 25 by means of push-pull linear actuators which are not readily seen in the drawings.

The second working arm 27 carries at its outer most end 30, a second working implement 32 which in the present example is an excavating bucket, but could be a hammer drill or other working implement as desired.

The superstructure 25 also mounts an operator's cab 29. Within the cab 29 there is provided an operator position p which includes an operator seat 34 and controls 35, operable by an operator when occupying the seat 34 to manipulate the various actuators 17, 22a, 27a of the working arms 16 and 27, as well as to cause the superstructure 25 to rotate about the first generally upright axis B relative to the body 11.

The operator's cab 29 is mounted with respect to the superstructure 25 for rotation about a third generally upright axis E which in the present example is coincident with the second generally upright axis B about which the superstructure 25 rotates relation to the body 11 but which in another example could be offset longitudinally and/or laterally of the machine relative to axis B. Rotation of the superstructure 25 relative to the body 11 is achieved by a hydraulic motor which acts between the body 11 and the superstructure 25; rotation of the operator's cab 29 relative to the superstructure 25 is achieved with a second hydraulic motor which acts between the cab 29 and the superstructure 25, although in both cases, if desired, rotation of the superstructure 25 and/or the cab 29 might be achieved with linear actuators.

The second working implement e.g. bucket 32 or a hammer drill, is mounted to the second working arm 27 by a mounting structure 100 which again preferably is the kind which releasably mounts the excavating bucket 32 or other second working implement.

The second working arm 27 includes a boom 28 which is mounted to the superstructure 25 at the mounting 26, at one end 28a of the boom 28.

At the other end 28b of the boom 28, the boom 28 is mounted pivotally to a dipper 31. The pivot axis between the boom 28 and dipper 31 is a fourth generally horizontal axis indicated at G in the drawings. The dipper 31 may be pivoted relative to the boom 28 by means of a dipper actuator 31a which acts between the boom 28 and the dipper 31. The dipper 31 carries at a second end thereof, the second working implement 32 and the second working implement 32 is pivotable about a generally horizontal axis H relative to the dipper 31 by means of a hydraulic actuator 32a which acts between the dipper 31 and the second working implement 32.

Figure 9:
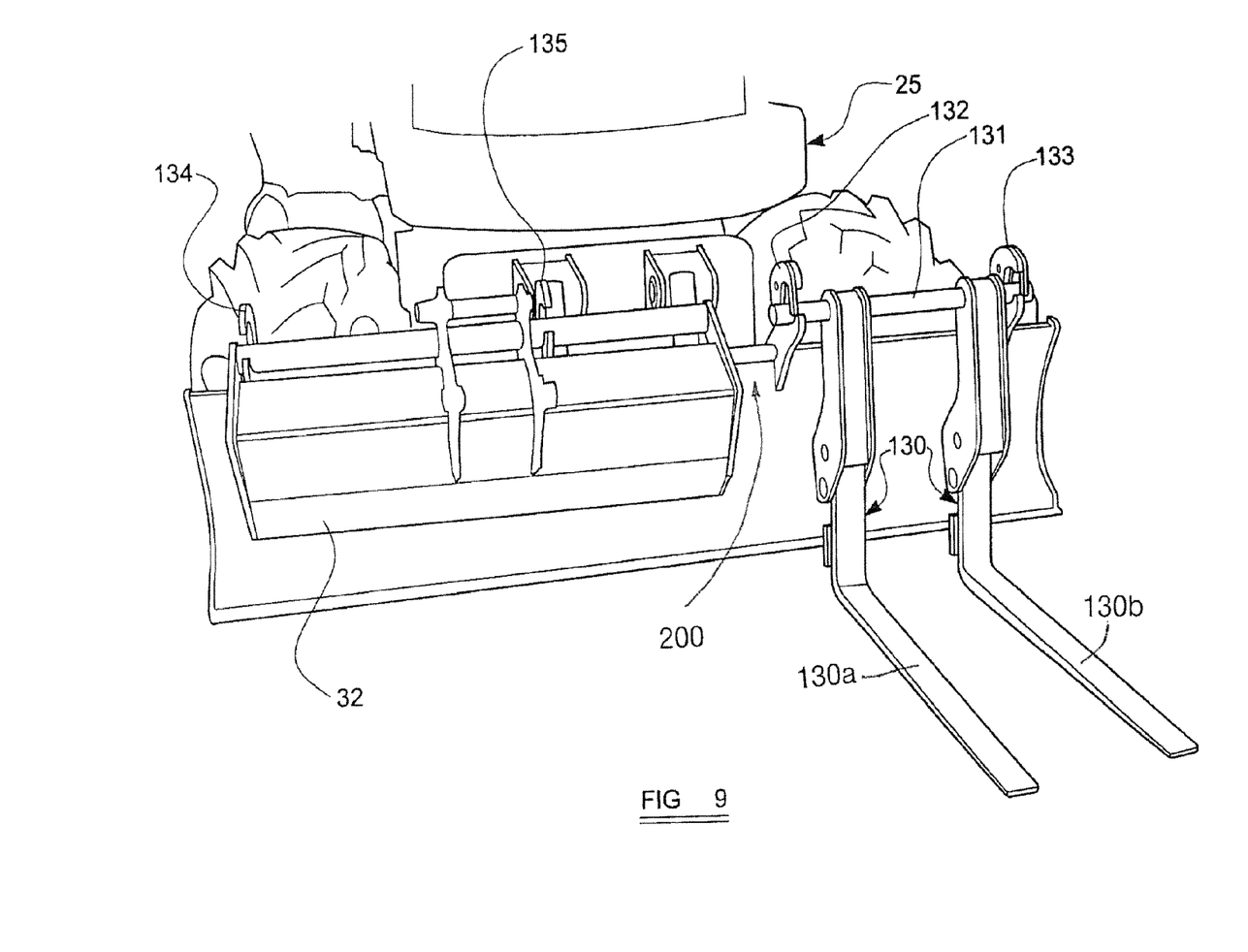
FIG. 9 is an illustrative view of another end of the machine showing forks and excavating bucket mounted on a mounting structure.

The machine 10 includes a third working implement 40 which is provided at the second end 24 of the machine 10. The third working implement 40 is a grading or dozer blade which extends across substantially the entire width of the machine as best seen for example, in FIG. 2. The blade 40 is mounted on a mounting structure 41 which not only permits the blade 40 to pivot relative about a further generally horizontal axis J relative to the body 11 of the machine 10, but also the blade 40 may be raised and lowered by operating an actuator 40a which acts between the body 11 and the blade 40 via a linkage 40b. The implement 40 and mounting structure 41 together provide a further mounting assembly 200, as best seen in FIG. 9.

The ground engaging structure 12 includes a first pair of wheels 45a, 45b provided at either end of an axle 46, and in this example, the axle 46 is pivotable relative to the body 11 via a generally conventional generally central pivot mount so that the axle 46 may oscillate relative to the body 11 in response to encountering variations in ground level as the machine 10 moves over the ground.

The ground engaging structure further includes a second pair of wheels 48a, 48b carried on a rigid axle 47. In this example, all four wheels 45a, 45b and 48a and 48b are drivable by a transmission from the engine 12 and are each steerable via a steering mechanism by the operator at the operating position 32 turning a steering wheel 35a.

Different operating modes of the machine will now be described.

Figure 1:
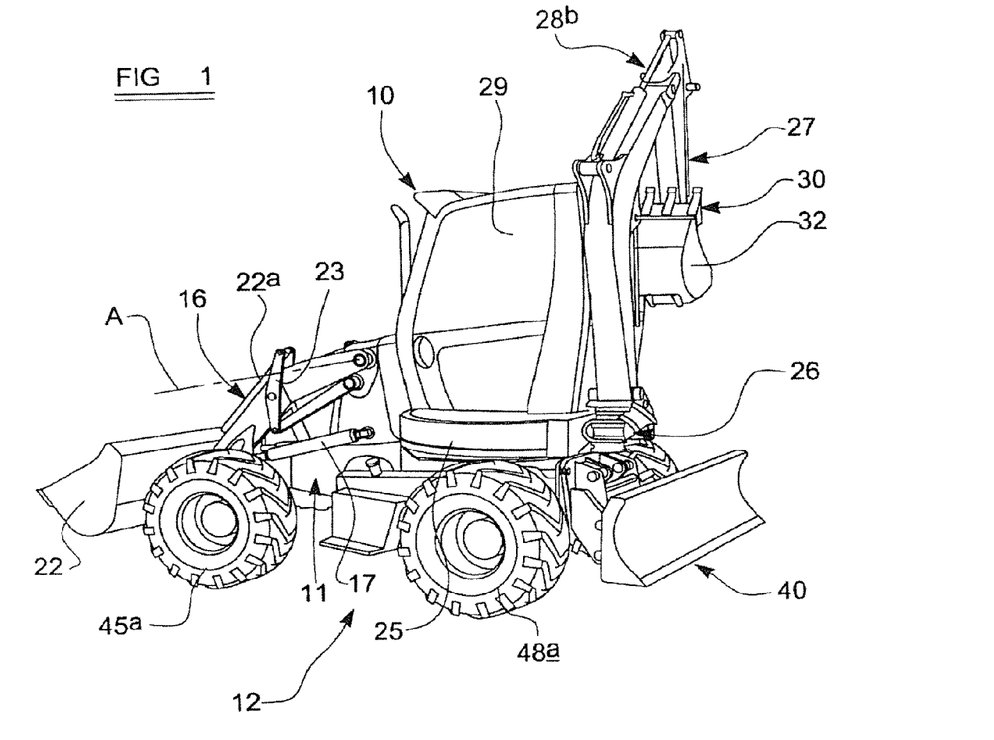
FIG. 1 is a perspective illustrative view of a working machine in accordance with the invention from a second end of the machine and the side.
Figure 2:
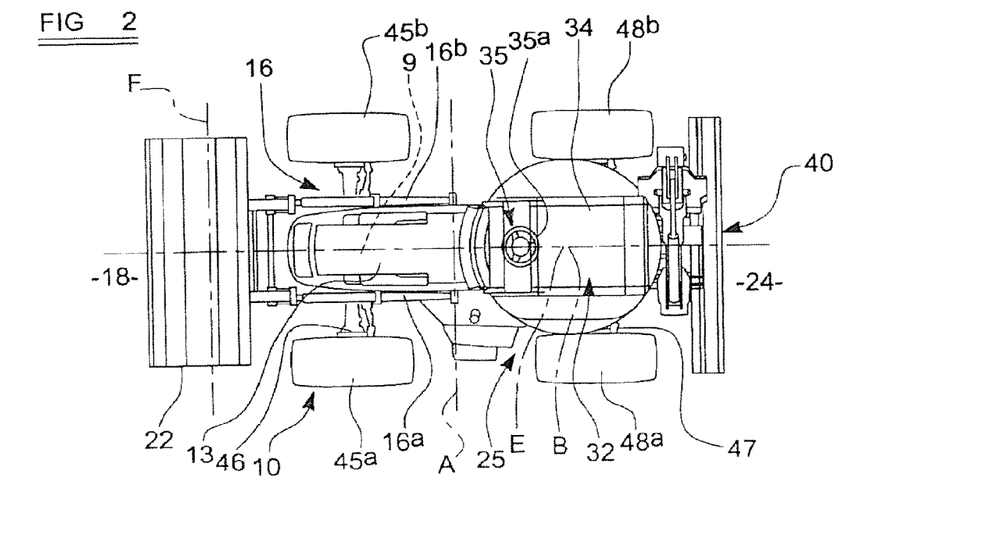
FIG. 2 is a plan view of the machine of FIG. 1.

In a first operating mode, in which the machine may perform loading operations using the loading shovel 22, the superstructure 25 is rotated to the position shown in FIG. 1 in which the joint 26 is provided adjacent the one wheel 48a of the second pair of wheels, so that the second working arm 27 and second working implement 32 can be stowed in the compact condition shown in FIGS. 1 and 2. To achieve this, the boom 28 and dipper 31 and second working implement 32 will need to be manipulated to raise the boom 28 and to fold the dipper 31 and the second working implements 32.

The operator's cab 29 may then be rotated about the third generally upright axis E in order to bring the operator's position P to face the first end 18 of the machine 10. In this condition, the operator may manipulate the controls 35 in order to operate the various loader actuators 17 and 22a in order to perform loading operations by pivoting the loading arm 16 about the first horizontal axis A and by pivoting the loading bucket 22 about the generally horizontal axis F.

In this condition, the superstructure 25 and operator's cab 29 will be locked in the positions described. Generally, the third working implement 40 will be raised clear of the ground during the performance of loading operations and because the superstructure 25 is rotated to the position described, the second working arm 27 will not obstruct the vision of the operator when performing working operations.

Figure 3:
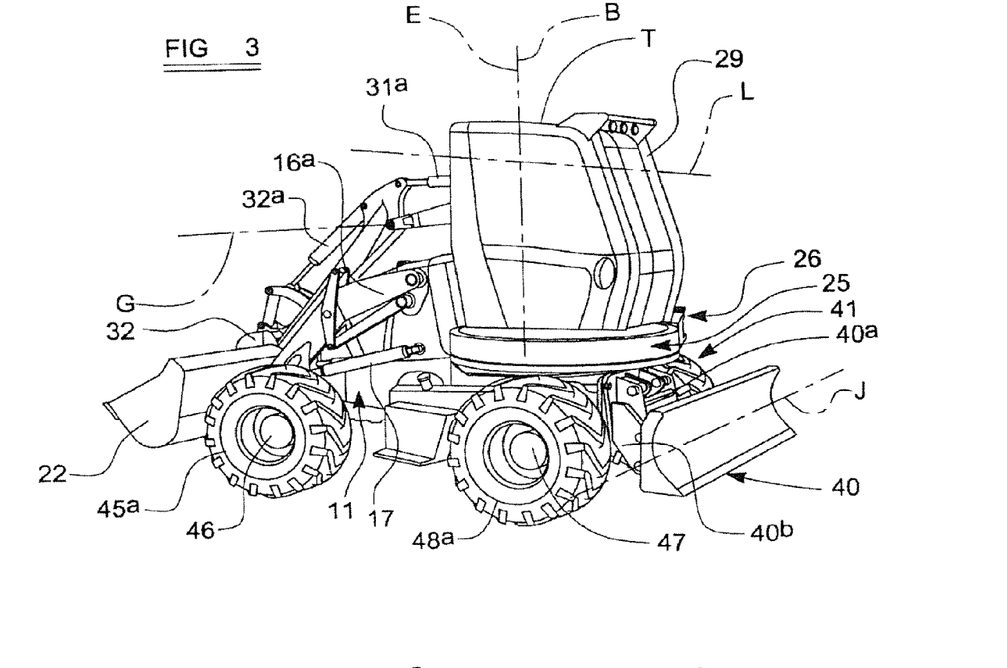
FIG. 3 is a view similar to FIG. 1 but showing the machine operating in a different mode of operation.
Figure 4:
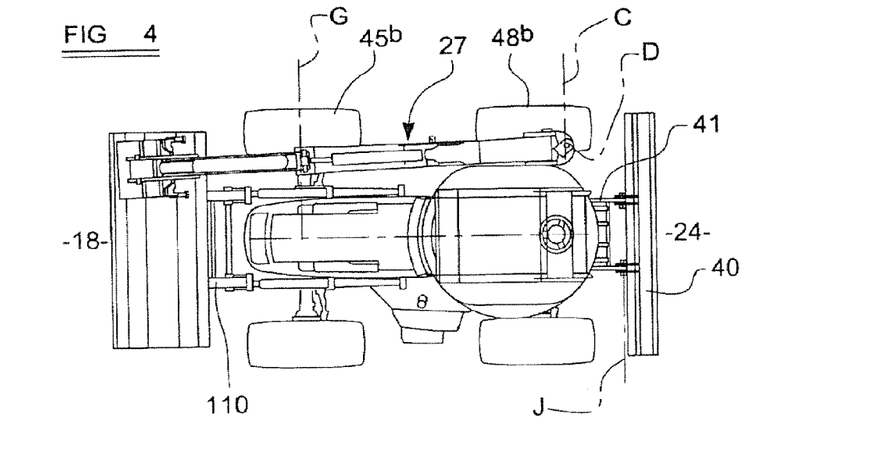
FIG. 4 is a plan view of the machine in the mode of operation depicted in FIG. 3.

In a second operating mode when the machine 10 is configured as indicated in FIGS. 3 and 4, the superstructure 25 is rotated relative to the body 11 to the position shown in which the joint 26 will be over opposite wheel 48b of the second pair of wheels. In this position, the boom 28 and dipper 31 may be manipulated, as well as the second working implement 32 to adopt the condition shown in which the second working implement 32 is stowed in the loading shovel 22 at the one end 18 of the machine 10.

The operator's cab 29 is then rotated to bring the operating position 32 to face the second end 24 of the machine 11. In this condition, the machine 10 may be driven in a direction with the second end 24 of the machine 10 leading, which in this example, is the usual forwards direction of travel of the machine 10 on-road.

The second working arm 27 and second working implement 32 thus are stowed by the side of the operator's cab 29 during travelling of the machine 10, e.g. on a road, and do not present any obstruction to the operator's sight at least in forwards and mostly sideways directions. It can be seen that the excavating arm 27 is configured and/or is of such a length that in the second operating condition shown in FIGS. 3 and 4, no part of the second working arm 27 extends above a top T of the operator's cab 29, and moreover, no part of the excavating arm 27 extends above a line L indicative of the top of the operator's head when sat in his seat 34.

Being driven in this configuration, having the pivoted axle 46 towards the rear end 18 of the machine 10 provides stability advantages.

In the second operating condition shown in FIGS. 3 and 4, the loading arm 16 is lowered but the loading shovel 22 is well clear of the ground, and the blade 40 is raised sufficiently clear of the ground to present no potential obstruction.

Figure 5:
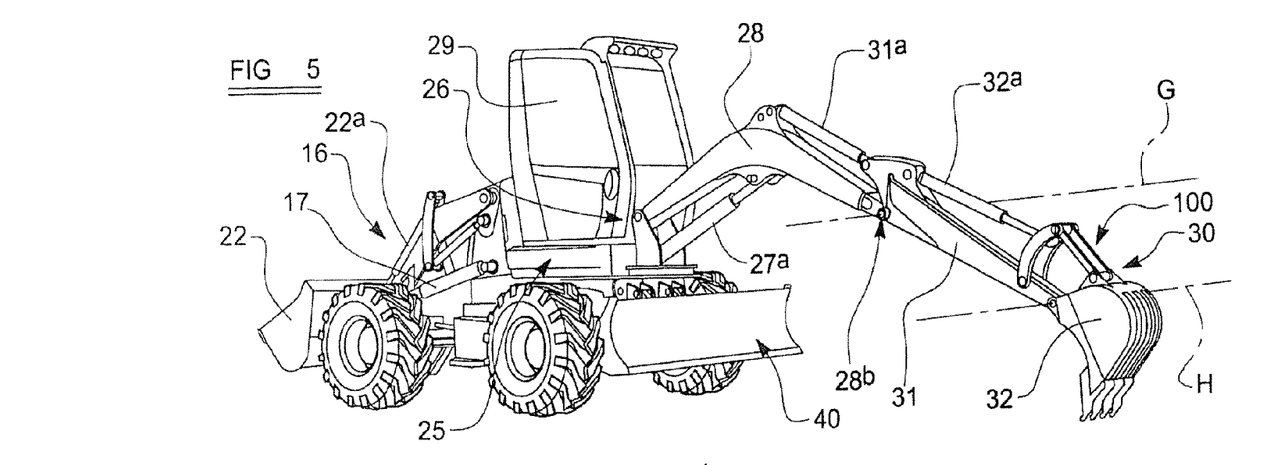
FIG. 5 is yet another view similar to FIG. 1 again showing the machine operating in a another different mode of operation.
Figure 6:
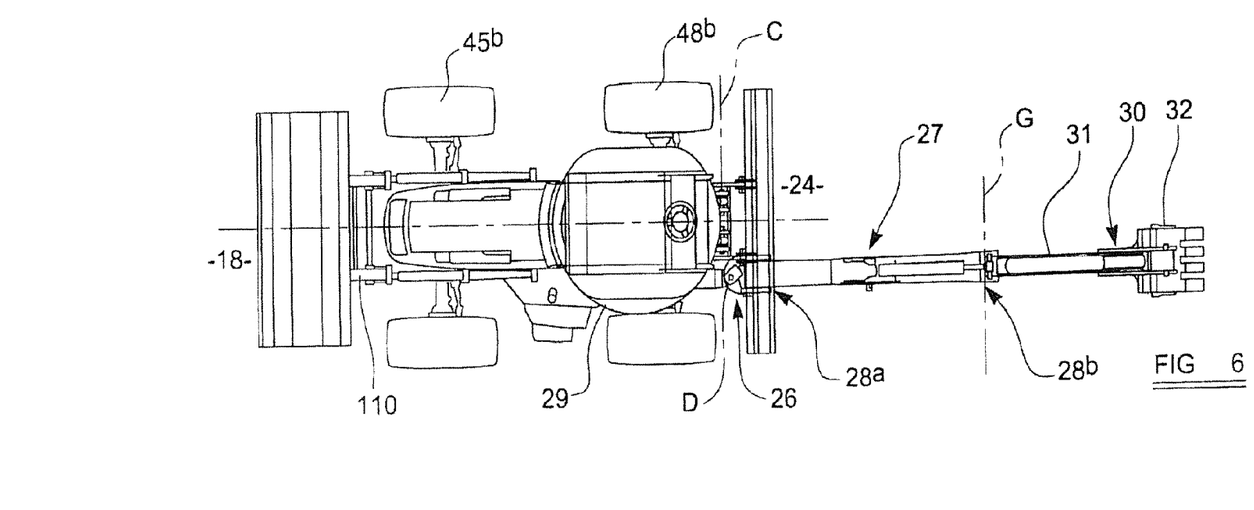
FIG. 6 is a plan view of the machine in the mode of operation depicted in FIG. 5.

In a third mode of operation when the machine will be configured, for example as shown in FIGS. 5 and 6, the superstructure 25 may be rotated about its generally upright axis B relative to the body 11 to bring the second working arm 27 to any desired position throughout the range of rotation possible, so that the second working arm 27 may be used for excavating operations. Desirably the operator's cab 29 is rotated relative to the superstructure 25 to bring the operator's cab 29 to a position behind the second working arm 27 to that the operator position P will be behind the second working arm 27 generally, as the second working arm 27 performs its operations.

During excavating, using the second working arm 27, typically the third working implement 40, i.e. the grading/dozer blade 40 will be lowered into contact with the ground. Furthermore, the loading shovel 22 may also be lowered into contact with the ground, in each case to improve stability of the machine 10.

During the third mode of operation, the operator's cab 29 will generally be locked relative to the superstructure 25 so that the cab 29 and superstructure 25 will rotate together during excavating operations.

The controls 35 within the operator's cab 29 may include in addition to the steering wheel 35*a*, foot pedals, transmission controls and other controls necessary for driving the machine 10 in the second operating mode as described above. The loading arm 16 and second working arm 27 may be manipulated via joystick controls which may be connected to the hydraulic control valve assembly via pilot servo hydraulic service lines, or electrical servo service lines.

When the superstructure 25 and/or cab 29 are rotated about their respective axis B and E it will appreciated that continuity of the service line communication between on the one hand the cab 29 and the superstructure 25 and on the other hand between the superstructure 25 and the body 11, is required.

A service line switching structure S is therefore required so that for example, when the operator's cab 29 is facing the first end 18 of the machine 10, as in the first operating mode described above, the joystick or other controls 35 are operable to control the hydraulic actuators 17 and 22*a*, but when the operator's cab 29 is facing the second end 24 of the machine 10, or at least other than facing the front end 18 of the machine 10, the controls 35 are operable to control the hydraulic actuators 31*a*, 32*a* and 27*a* for manipulating the second working arm 27 and the second working implement 32.

It will be appreciated that in the second operating mode particularly as described above, if instead of the second working implement 32 being an excavating bucket as shown in FIGS. 1 to 6, a rather longer working implement is provided at the end 30 of the second working arm 27, it might not be possible to accommodate the second working implement 32 in the loading shovel 22. Moreover, if a plurality of working implements are provided which may, for alternative work operations, be carried by the excavating arm 27 by means of the releasable mounting structure 100, when moving the machine 10 from site to site it would be necessary separately to transport each of the working implements which are not being carried at the end of the excavating arm. This can be very inefficient.

Figure 7:
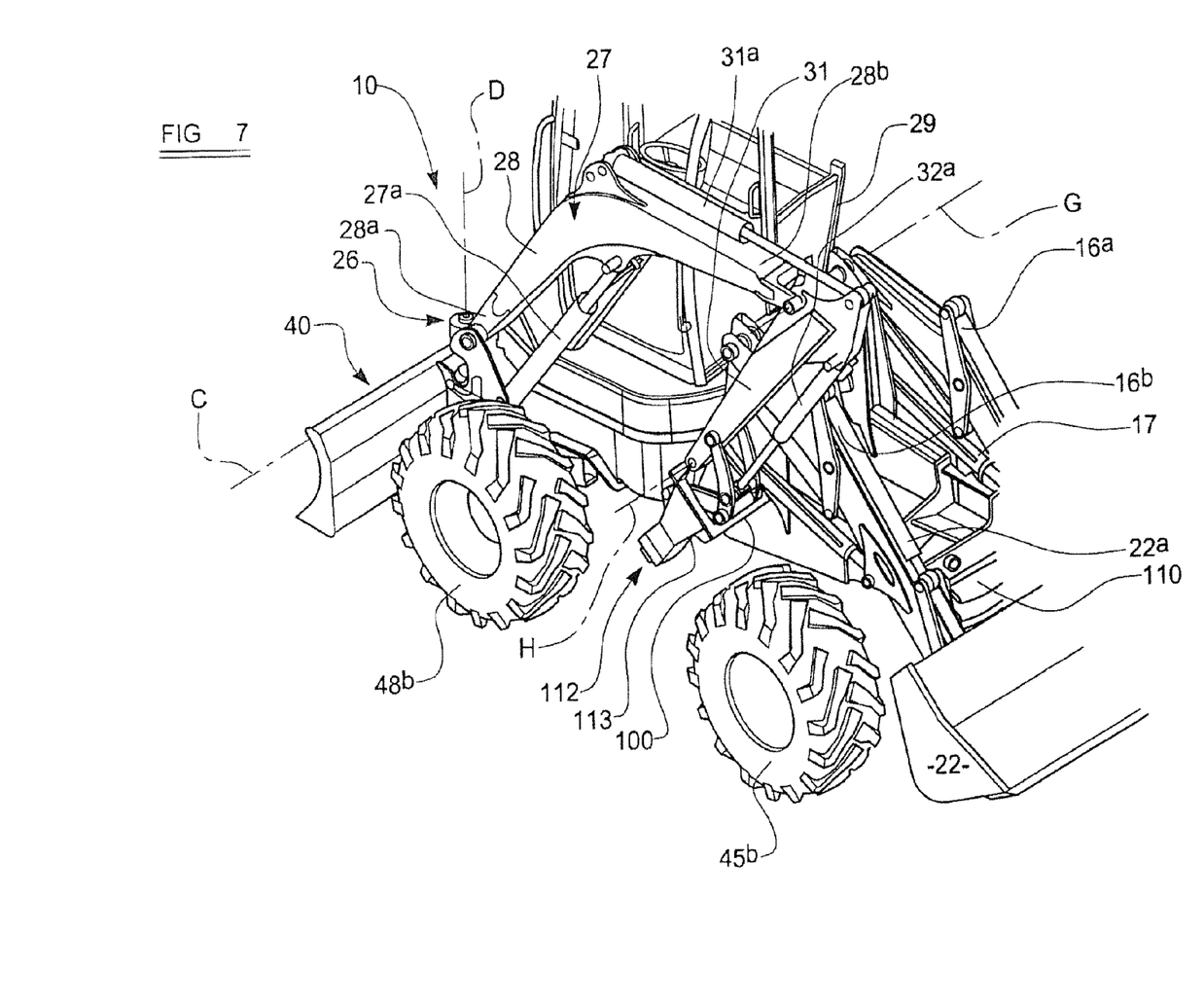
FIG. 7 is a illustrative perspective view from a first end and the rear of part of the machine, showing the machine performing a particular operation.

In FIG. 7 it can be seen that the machine 10 has a holding device 112. In this example, the holding device 112 is secured to the side of the body 11 between the wheels 45*b* and 48*b* at the left hand side of the machine 10 when considered travelling in its usual forward direction with the second end 24 of the body 11 leading.

The holding device 112 provides an internal chamber into which a working implement can be inserted by manipulating the second working arm 27 as shown in FIG. 7.

When the implement 32 is inserted in the chamber, the mounting structure 100 may be operated to release the working implement 32 and the second working arm 27 may then move the mounting structure 100 away from the holding device 112 either for stowage in the loading shovel 22 as shown in FIG. 4 or 5, or in order that the second working arm 27 may be used to carry an alternative second working implement 32. Thus in FIG. 7, the second working implement is shown to be a hammer drill attachment 113 and the holding device 112 is correspondingly configured to receive the hammer drill attachment 113. When the mounting structure 100 releases the hammer drill attachment 113, the mounting structure 100 may then engage an alternative working implement such as the excavating bucket 32 already described.

The shape and configuration of the holding device 112 will of course depend upon the nature of the second working implement to be held thereby. For example, where a holding device 112 is for holding a working implement which is an excavating bucket 32, the holding device 112 may include formations to engage the inside and/or outside of the excavating bucket 32 as required.

Figure 7A:
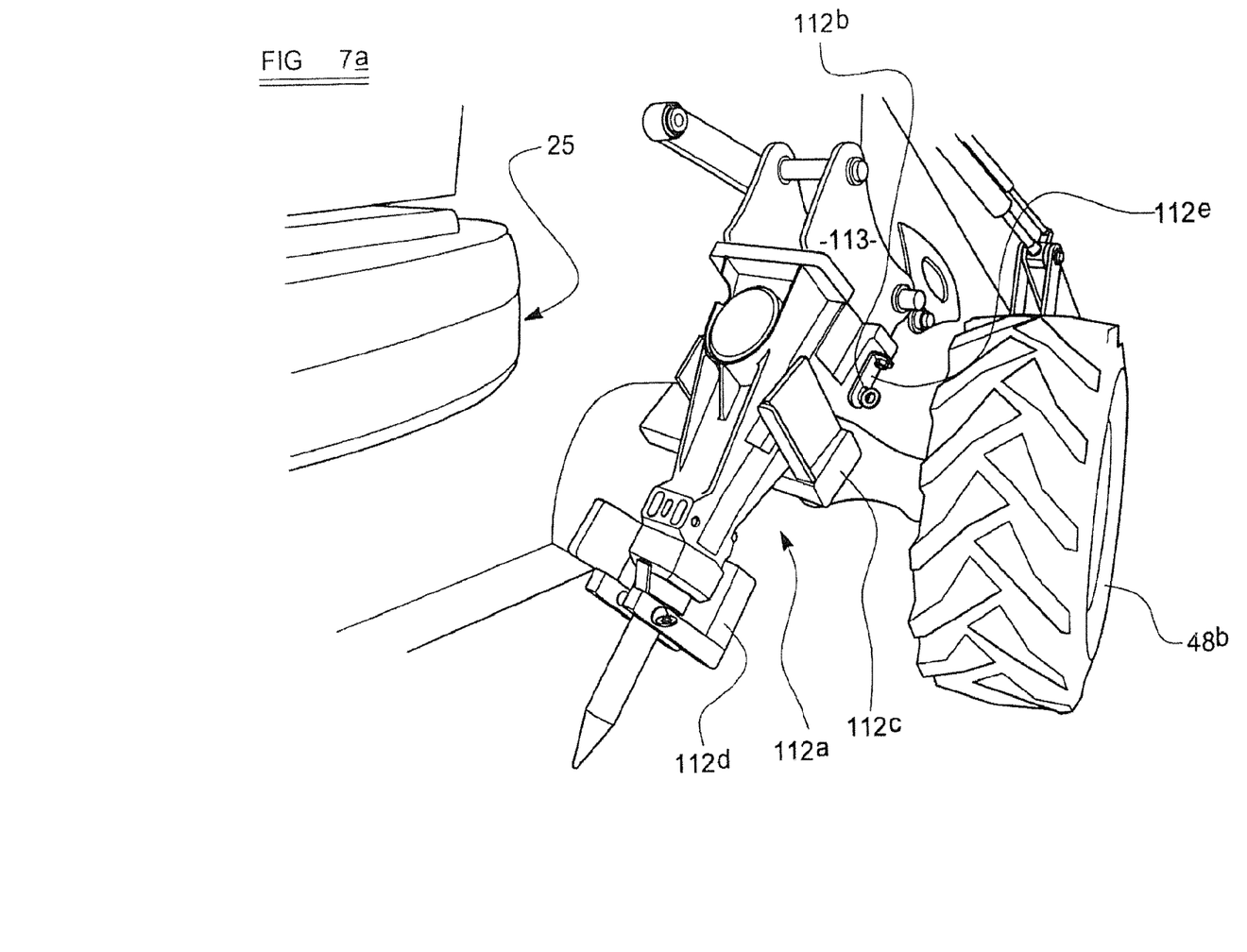
FIG. 7a is an illustrative perspective view of a holding device for holding a hammer drill attachment.

FIG. 7*a* shows an alternative holding device 112*a* for a hammer drill attachment 113 which is provided by two holder parts 112*c*, 112*d* which support the attachment 113, and a locking device 112*e* which includes a locking pin 112*b* to lock the attachment 113 in the holding device 112*a*.

Of course any number of holding devices 112/112*a* may be provided on the body 11 for which there is space for example, behind or in front of the dozer blade 40, or elsewhere on the machine 10 and thus a plurality of working implements 32 may be transported by the machine 10 either held by the holding device(s) 112/112*a* or carried out the outermost end 30 of the second working arm 27.

The mounting structure 100 may be a manually operable structure although preferably is hydraulically operated by means of a hydraulic actuator operating and/or releasing a latch. The configuration of so called "quick connectors" is well known.

In place of the loading shovel 22, the mounting structure 110 at the end of the loading arm 16 may instead carry an alternative first working implement 22 such as a loading forks 130. Such loading forks 130 may be mounted by the mounting structure 110 so as to be pivotable about a generally horizontal axis to lift and engage loads such as pallets.

The loading forks 130 generally include a pair of fork elements 130*a*, 130*b* which may comprise integral L-shaped components which are mounted by a mounting member at the uppermost ends of the fork elements. The mounting structure 110 may include a plurality of recesses which, at least when the loading shovel 22 is disengaged from the mounting structure 110, can receive the mounting member of the loading forks working implement. Thus the loading arm 16 may be used for loading operations utilizing the loading forks instead of the loading shovel 22 as formerly described.

In another example, the mounting structure 110 may be capable of simultaneously mounting the loading shovel 22 and a loading forks, with the fork elements being moveable between a stowed position essentially behind the loading shovel 22 and an operative position in front of the loading shovel 22. Alternatively, the stowed loading forks may only be utilizable after the loading shovel 22 has been disengaged from the mounting structure 110.

Figure 8:
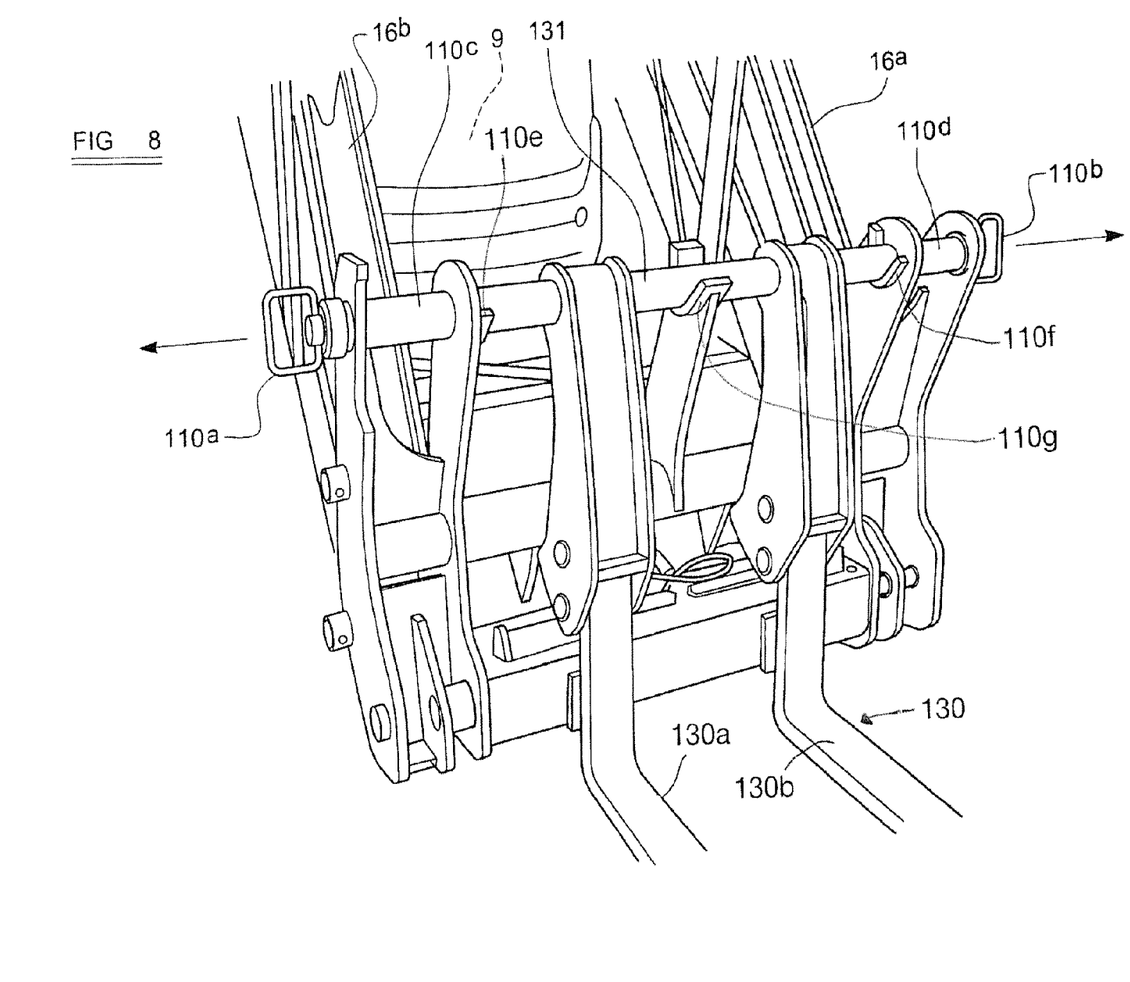
FIG. 8 is an illustrative view of one end of the machine where loading forks are mounted.

In FIG. 8, a pair of loading forks 130 are shown mounted on mounting structure 110 from which the loading shovel 22 has been disengaged. Individual fork elements 130*a*, 130*b* of the pair 130 are shown folded forward from an inoperative position behind the shovel 22, to an operative position as shown. The forks 130 are provided on a mounting member 131 which is separable from the remainder of the mounting structure 110. This is achieved by removing a pair of latch locking pins 110*a*, 110*b*, by longitudinal movement, indicated by the respective arrows. The pins 110*a*, 110*b*, extend into the inside of the mounting member 131, and when the pins 110*a*,110*b* are removed, the mounting member 131 is released.

The mounting structure 110 includes a pair of receiving formations 110*e* and 110*f*, and a central support 110*g* to support the mounting member 131 when the latches 110*a*, 110*b* are released.

When the mounting member 131 and forks 130 are removed, the remainder of the mounting structure 110 may again be used to mount the shovel 22, as shovel support parts 110*e*, 110*d*, through which the pins 110*a*, 110*b* otherwise extend into the mounting member 131, will remain, to receive mounting formations of the shovel 22.

The third working implement, i.e. the dozer/grading blade 40 mounting structure 41 may also provide recesses 132, 133 (see FIG. 9) capable of receiving the mounting member 131 for the loading forks working implement 130. Preferably such recesses 132, 133 are provided on the blade 40, by the further mounting structure 41 in a position such that the loading forks 130 may be simultaneously carried by the further mounting structure 41 so that it is unnecessary to remove the grading/dozer blade 40 before carrying loading forks 130.

Desirably, the second working arm 27 i.e. the mounting structure 100, and/or the second working implement carried at the outermost end 30 of the second working arm 27, are manipulatable by the operator to disengage the loading forks 130 from the mounting structure 110 at the one end 18 of the machine 10, and to transport the loading forks 130, on the mounting member 131, to the second end 24 of the machine 10 where they may be received by the blade 40 and/or the further mounting structure 41 of the third working implement 40. Such manipulation may involve the relative pivoting of the mounting structure 110 which may or may not be mounting the second working implement 32, the dipper 31 and the boom 28, movement of the second working arm 27 about its mounting 26 and around both generally horizontal C and generally upright axis D, and also swiveling of the superstructure 25 as necessary. However, this enables a single loading forward working implement i.e. forks 130 to be provided, which is useable at both the first end 18 and the second end 24 of the body 11, and no or minimal manual handling of the loading forks is required in order to transport them from the first end 18 of the body 11 to the second end 24 of the body 11.

It will be appreciated that with the loading forks 130 mounted by the blade 40 and/or further mounting structure 41 of the third working implement 40, the machine 10 may be operated in the first mode described above utilising the or a further loading shovel 22 to be carried at the outer end of the loading arm 16, and the machine 10 may be operated in the second and third operating modes too.

The machine 10 of the invention is particularly useful for operations involving the laying of paving when the loading forks 130 may be received by the further mounting structure 41 of the third working implement 40 and the second working arm 27 may be manipulated to transport sand and the like material stowed and held in the loading shovel 22 to the second end 24 of the machine 10. In this way it has been found that the machine 10 may be used for working functions including the laying of paving without the need for frequent repositioning of the machine 10 to bring respective working implements 22, 32, 40 to locations adjacent a position where work operations are carried out.

Various modifications are possible without departing from the scope of the invention.

As described in the example, the loading arm 16 includes a pair of spaced arm members 16a, 16b, but in another example, the loading arm 16 may be provided by a single loading arm member which may be received for example to one side of the bonnet 13 or other body housing part and the prime mover 12.

In the example described, the prime mover 9 is an engine, but in another example could be an alternative kind of prime mover such as an electric motor.

The particular configuration of the loading arm 16 shown is only exemplary, as is the particular configuration of the second working arm 27. In another example, in place of or in addition to the grading/dozer blade 40, the machine 10 may be provided with stabilizers for use during excavating operations using the second working arm 27 and second working implement 32.

The boom 28 of the second working arm 28 need not be of the "banana" shape shown although this is useful for ensuring that the overall length of the second working arm 27 and its configuration does not obscure sight lines of the operator at least when the machine is in its second working configuration described above.

In another example, the machine 10 may only be steerable by two wheels. The axles 46, 47 could be suspended from the body 11 if desired.

In the example shown, the wheels 45 and 48 are small so as to provide maximum stability during, for example, excavating operations, but could be larger.

If desired, the machine 10 may include sensors to indicate if the machine 10 is becoming laterally unstable for example when the second working arm 27 is performing excavating operations at either side of the machine 10.

In the example described, the superstructure 25 is not able to rotate relative to the body 11 through a full 360°, but rather rotation is restricted to about 270°. Thus rotatable couplings in order to provide continuity of hydraulic and/or electrical services between the superstructure 25 and body 11 need not be provided, but hydraulic connections may be made by hoses and electrical connections by cables. Similarly, the operator's cab 29 preferably is not rotatable through 360° relative to the superstructure 25, but is only rotatable through about 180°, but possibly up to 270° again to facilitate to conveyance of services between the superstructure 25 and operator's cab 29 without involving expensive rotatable type couplings.

In this example, the third working implement i.e. dozer blade 30 and/or the further mounting structure 41 may provide further recesses 134, 135 to receive and retain the second working implement, e.g. where this is an excavating bucket, as indicated in FIG. 8, alongside the forks 130 where there are mounted at the end 24 of the machine 10.

Thus when the excavating arm 27 is carrying, for example, the hammer attachment 113, the excavating bucket 32 may be stowed and carried in the second end 24 of the machine 10, on the further mounting assembly 200 of the third working implement 30 and mounting structure 41.

The further recesses 134, 135 of the further mounting assembly, may have latches to lock the mounting member 131 relative to the further mounting assembly 200.

The excavating bucket 32 may be moved to its stored position as shown in FIG. 8, by manipulating the excavating arm 27.

The invention claimed is:

1. A working machine including a body and a ground engaging structure, the body mounting a prime mover and a first working arm, the first working arm being pivoted for up and down movement about a first generally horizontal axis, and extending beyond a first end of the body and carrying in use, at its outermost end, a first working implement, and the body carrying towards a second end of the body opposite to the first end, a superstructure which is rotatable relative to the body about a first generally upright axis, the superstructure providing a mounting on which is mounted a second working arm, which mounting permits the second working arm to be pivoted up and down about a second generally horizontal axis and to be rotated about a second generally upright axis, and the second working arm in use, carrying at an outermost end, a second working implement, the superstructure mounting an operator's cab which provides an operator position including an operator seat and controls operable by an operator when occupying the seat, and wherein the cab is rotatable about a third generally upright axis relative to the superstructure.

2. A machine according to claim 1 wherein the operator's cab is rotatable relative to the superstructure to a position in which the operator in the operator position is facing the first end of the machine, in which position the controls are operable for performing working operations using the first working implement.

3. A machine according to claim 1, wherein when the operator's cab is rotated relative to the superstructure to a position in which the operator in the operator position is facing the first end of the machine, the second working arm is stowable at the second end of the body by rotating the superstructure relative to the body, to bring the mounting to a position at the second end of the machine.

4. A machine according to claim 1 wherein the cab is rotatable relative to the superstructure to a position in which the operator in the operator position is facing the second end of the body, in which position the operator may operate the controls to drive the machine in a travelling direction.

5. A machine according to claim 1 wherein the superstructure is rotatable relative to the body so that the mounting for the second working arm is between the first and second ends of the machine, whilst the operator's cab is rotatable relative to the superstructure so that the excavating arm is generally in front of the operator position, in which position the controls are operable for performing working operations using the second working implement.

6. A machine according to claim 1 wherein the first working implement is a loading shovel and the first working arm is provided by a pair or arm members which, at least when the first working arm is pivoted downwards, receive between them, the prime mover.

7. A machine according to claim 6 wherein the prime mover is housed beneath a body structure.

8. A machine according to claim 6 wherein the loading shovel is pivoted about a third generally horizontal axis relative to the working arm, under the control of the controls of the operator position.

9. A machine according to claim 1 wherein the second working arm includes a boom part which is mounted by the mounting to the superstructure at one end, and to one end of a dipper at or adjacent the other end, the dipper being pivotal relative to the boom at a first end of the dipper, about a fourth generally horizontal axis and carrying at a second end thereof, the second working implement.

10. A machine according to claim 9 wherein the second working implement is one of an excavating bucket, or a hammer tool.

11. A machine according to claim 1 wherein the superstructure is rotatable through less than 360 degree relative to the body.

12. A machine according to claim 1 wherein the operator's cab is rotatable through less than 360 degree relative to the superstructure.

13. A machine according to claim 1 wherein the overall length and configuration of the second working arm is such that with the superstructure rotated to a position in which the operator in the operator position is facing the second end of the body, and when the superstructure is rotated to a position in which the second working arm extends towards the first end of the machine alongside the operator's cab, with the second end of the second working arm and/or the second working implement carried thereby, in engagement with the first working implement, the boom and dipper are relatively pivotable about the third second and fourth generally horizontal axes such that the second working arm does not extend above the height of the operator's cab.

14. A machine according to claim 13 wherein the second working arm does not extend above the height of an operator seated in the operator position.

15. A machine according to claim 1 wherein the machine includes a third working implement carried at the second end of the body.

16. A machine according to claim 15 wherein the third working implement is a blade mounted for up and down pivoting about a fifth generally horizontal axis, under the control of an operator operating the controls of the operator position.

17. A machine according to claim 1 wherein there are provided at the second end of the body, stabilisers which are lowerable into engagement with the ground.

18. A machine according to claim 1 wherein the prime mover is an engine, there being a transmission from the prime mover to drive wheels of the ground engaging structure to enable the machine to travel.

19. A machine according to claim 1 wherein the primary forwards direction of travel of the machine is with the second end of the body leading.

20. A machine according to claim 1 wherein the ground engaging structure includes four wheels which are steerable by an operator operating a steering wheel control of the operator position.

* * * * *